United States Patent
Far et al.

(10) Patent No.: US 10,191,167 B2
(45) Date of Patent: Jan. 29, 2019

(54) CORRECTING THE EFFECTS OF DEVIATION AND DISPERSION ON SONIC LOG MEASUREMENTS OF DEVIATED WELLS IN LAMINATED FORMATIONS

(71) Applicant: Halliburton Energy Services, Inc., Houston, TX (US)

(72) Inventors: Mehdi Eftekhari Far, Humble, TX (US); John Andrew Quirein, Georgetown, TX (US); Natasa Mekic, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/326,111

(22) PCT Filed: Jan. 28, 2016

(86) PCT No.: PCT/US2016/015270
§ 371 (c)(1),
(2) Date: Jan. 13, 2017

(87) PCT Pub. No.: WO2017/003517
PCT Pub. Date: Jan. 5, 2017

(65) Prior Publication Data
US 2018/0210103 A1 Jul. 26, 2018

Related U.S. Application Data

(60) Provisional application No. 62/186,975, filed on Jun. 30, 2015.

(51) Int. Cl.
*G01V 1/36* (2006.01)
*G01V 1/30* (2006.01)
*G01V 1/28* (2006.01)

(52) U.S. Cl.
CPC ............... *G01V 1/36* (2013.01); *G01V 1/284* (2013.01); *G01V 1/306* (2013.01);
(Continued)

(58) Field of Classification Search
CPC . G01V 1/48; G01V 1/306; G01V 1/36; G01V 1/40; G01V 2210/54; G01V 2210/626; E21B 47/00
See application file for complete search history.

(56) References Cited

U.S. PATENT DOCUMENTS 5,661,696 A * 8/1997 Kimball .................. G01V 1/44
367/26
5,850,622 A * 12/1998 Vassiliou ................. G01V 1/32
702/17

(Continued)

FOREIGN PATENT DOCUMENTS

WO 2011010989 A1 1/2011

OTHER PUBLICATIONS

International Search Report and Written Opinion dated May 27, 2016 for International Application No. PCT/US16/15270, 10 pages.

*Primary Examiner* — Elias Desta
(74) *Attorney, Agent, or Firm* — Polsinelli PC (57) ABSTRACT

Systems and methods for simultaneously correcting the effects of deviation and dispersion on sonic log measurements of deviated wells in laminated formations and validating the corrected sonic log measurements using rock physics cross-plots.

20 Claims, 12 Drawing Sheets

(52) U.S. Cl.
CPC .... *G01V 2210/54* (2013.01); *G01V 2210/624* (2013.01); *G01V 2210/626* (2013.01)

(56) References Cited

U.S. PATENT DOCUMENTS

| | | |
|---|---|---|
| 8,145,462 B2 * | 3/2012 | Foucault ................. E21B 44/00 702/6 |
| 2008/0178668 A1 | 7/2008 | Yan et al. |
| 2010/0020642 A1 | 1/2010 | Sinha |
| 2013/0081804 A1 | 4/2013 | Sinha et al. |
| 2015/0012251 A1 | 1/2015 | Horne et al. |

* cited by examiner

FIG. 11B

CORRECTING THE EFFECTS OF DEVIATION AND DISPERSION ON SONIC LOG MEASUREMENTS OF DEVIATED WELLS IN LAMINATED FORMATIONS

CROSS-REFERENCE TO RELATED APPLICATIONS

This application claims the priority of PCT Patent Application No. PCT/US16/15270, filed on Jan. 28, 2016 and claims priority to U.S. Provisional Application No. 62/186,975, filed on Jun. 30, 2015, which is incorporated herein by reference.

FIELD OF THE DISCLOSURE

The present disclosure generally relates to systems and methods for correcting the effects of deviation and dispersion on sonic log measurements of deviated wells in laminated formations. More particularly, the present disclosure relates to simultaneously correcting the effects of deviation and dispersion on sonic log measurements of deviated wells in laminated formations and validating the corrected sonic log measurements using rock physics cross-plots.

BACKGROUND

Figure 1:
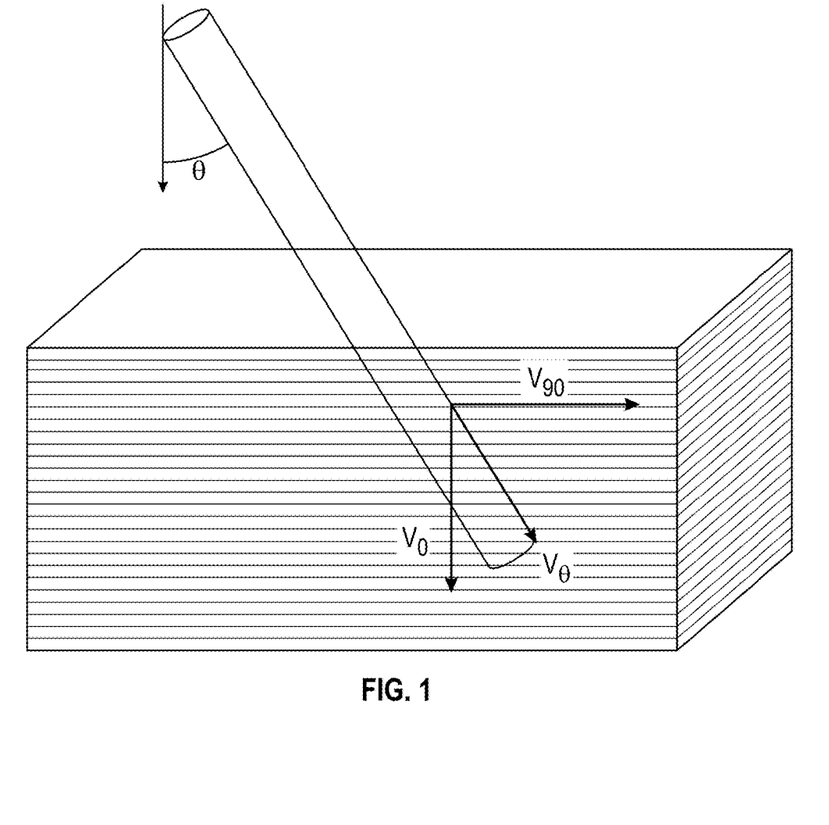
FIG. 1 illustrates a deviated well in a laminated medium.

In laminated rocks such as shales, compressional and shear waves propagate with different velocities in different directions. Therefore, when wells are drilled with an angle different from 0 or 90 degrees with respect to the lamination or bedding (i.e. deviated wells), the wave velocities measured along the wells are different from the velocities parallel or perpendicular to the bedding or lamination. In FIG. 1, a deviated well drilled at an angle θ through a laminated medium is illustrated. What actually is measured in this illustration is the velocity along the angle (Vθ). The same situation exists when a vertical or a horizontal well is drilled in a dipping layer with lamination. In either case, the velocity angle (Vθ) is being measured and in order to get vertical velocity (V0) or horizontal velocity (V90) if the well is near horizontal, deviation or anisotropy correction is required. Because sonic log measurements are used in many other applications such as, for example, geo-mechanics, hydraulic fracturing, borehole seismic, and wellbore stability, such corrections are crucial.

There are a limited number of published techniques for deviation correction; however, such techniques are not often practiced in the logging industry. Also such techniques, if practiced, may require advanced logging suites such as dipole sonic compared to the less expensive monopole sonic. And, some of these techniques are interval based methods-meaning they assume that each interval (lithological layer) has constant anisotropy parameters that are not the case in real earth. Some of these techniques also assume a group velocity is being measured instead of the more preferred phase velocities. Nevertheless, such techniques do not correct the effects of dispersion on sonic log measurements of deviated wells in laminated formations.

In order to validate the corrected sonic log measurements, conventional techniques may require sonic log measurements from vertical or near vertical wells that are close to the location of the deviated well where the correction is being applied. Even assuming sonic log measurements from neighboring wells are available, the process of validating the corrected sonic log measurements can be expensive. Conventional techniques thus, are not often practiced in the logging industry and mechanical properties that are interpreted from sonic log measurements can be inaccurate.

BRIEF DESCRIPTION OF THE DRAWINGS

The present disclosure is described below with references to the accompanying drawings in which like elements are referenced with like reference numerals, and in which.

DETAILED DESCRIPTION OF THE PREFERRED EMBODIMENTS

The present disclosure overcomes one or more deficiencies in the prior art by providing systems and methods for simultaneously correcting the effects of deviation and dispersion on sonic log measurements of deviated wells in laminated formations and validating the corrected sonic log measurements using rock physics cross-plots.

In one embodiment, the present disclosure includes a method for correcting the effects of deviation and dispersion on sonic log measurements of deviated wells, which comprises: a) defining Thomsen parameters for each log measurement depth using at least one of one or more formation constituents, one or more predetermined formation constraints, one or more predetermined formation type cut-offs and maximum Thomsen parameters for the formation; b) calculating dispersion, $V_{SH90}$, $V_{SH0}$, $V_{P0}$, $V_{P90}$, $V_{SV\theta}$, and new Thomsen parameters by correcting DTS and DTC for deviation and dispersion using the Thomsen parameters, and a non-linear solver and a computer processor; and c) plotting the actual log measurements and the calculated dispersion, $V_{SH90}$, $V_{SH0}$, $V_{P0}$, $V_{P90}$, $V_{SV\theta}$, new Thomsen parameters on separate respective graphs.

In another embodiment, the present disclosure includes a non-transitory program carrier device tangibly carrying computer executable instructions for correcting the effects of deviation and dispersion on sonic log measurements of deviated wells, the instructions being executable to implement: a) defining Thomsen parameters for each log measurement depth using at least one of one or more formation constituents, one or more predetermined formation constraints, one or more predetermined formation type cut-offs and maximum Thomsen parameters for the formation; b) calculating dispersion, $V_{SH90}$, $V_{SH0}$, $V_{P0}$, $V_{P90}$, $V_{SV\theta}$, and new Thomsen parameters by correcting DTS and DTC for deviation and dispersion using the Thomsen parameters, and a non-linear solver; and c) plotting the actual log measurements and the calculated dispersion, $V_{SH90}$, $V_{SH0}$, $V_{P0}$, $V_{P90}$, $V_{SV\theta}$, new Thomsen parameters on separate respective graphs.

In yet another embodiment, the present disclosure includes a non-transitory program carrier device tangibly carrying computer executable instructions for correcting the effects of deviation and dispersion on sonic log measurements of deviated wells, the instructions being executable to implement: a) defining Thomsen parameters for each log measurement depth using at least one of one or more formation constituents, one or more predetermined formation constraints, one or more predetermined formation type cut-offs and maximum Thomsen parameters for the formation wherein the one or more predetermined formation constraints and the one or more predetermined formation type cut-offs are identified for each actual log measurement; b) calculating dispersion, $V_{SH90}$, $V_{SH0}$, $V_{P0}$, $V_{P90}$, $V_{SV\theta}$, and new Thomsen parameters by correcting DTS and DTC for deviation and dispersion using the Thomsen parameters, and a non-linear solver; and c) plotting the actual log measurements and the calculated dispersion, $V_{SH90}$, $V_{SH0}$, $V_{P0}$, $V_{P90}$, $V_{SV\theta}$, new Thomsen parameters on separate respective graphs.

The subject matter of the present disclosure is described with specificity, however, the description itself is not intended to limit the scope of the disclosure. The subject matter thus, might also be embodied in other ways, to include different structures, steps and/or combinations similar to those described herein in conjunction with other present or future technologies. Moreover, although the term "step" may be used herein to describe different elements of methods employed, the term should not be interpreted as implying any particular order among or between various steps herein disclosed unless otherwise expressly limited by the description to a particular order. While the present disclosure may be applied in the oil and gas industry, it is not limited thereto and may also be applied in other industries (e.g. drilling water wells) to achieve similar results.

Method Description

Figure 4:
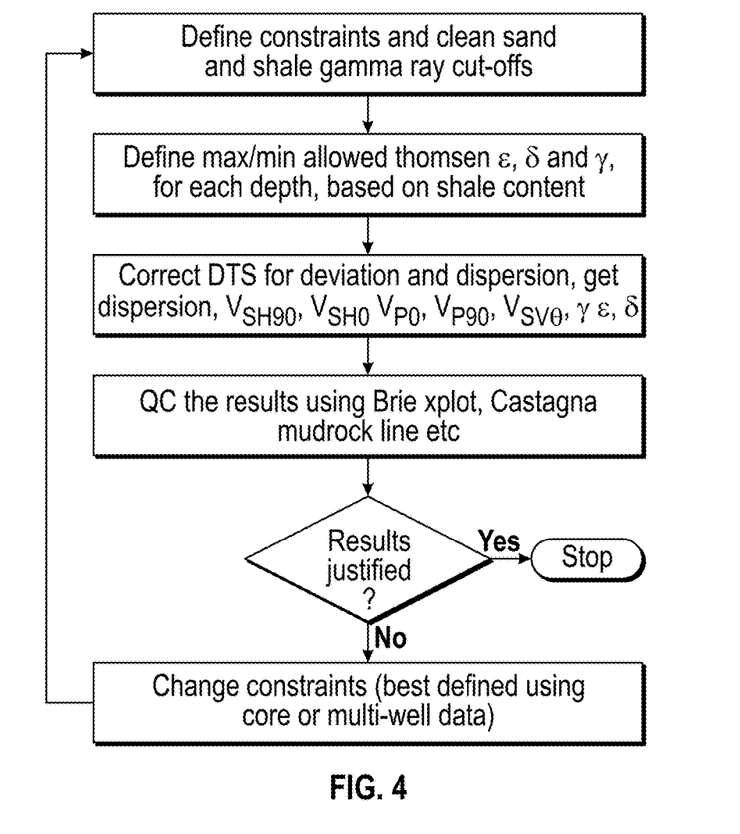
FIG. 4 is a flow diagram illustrating one embodiment of a method for implementing the present disclosure when optimizing for Vp and Vs simultaneously.
Figure 5:
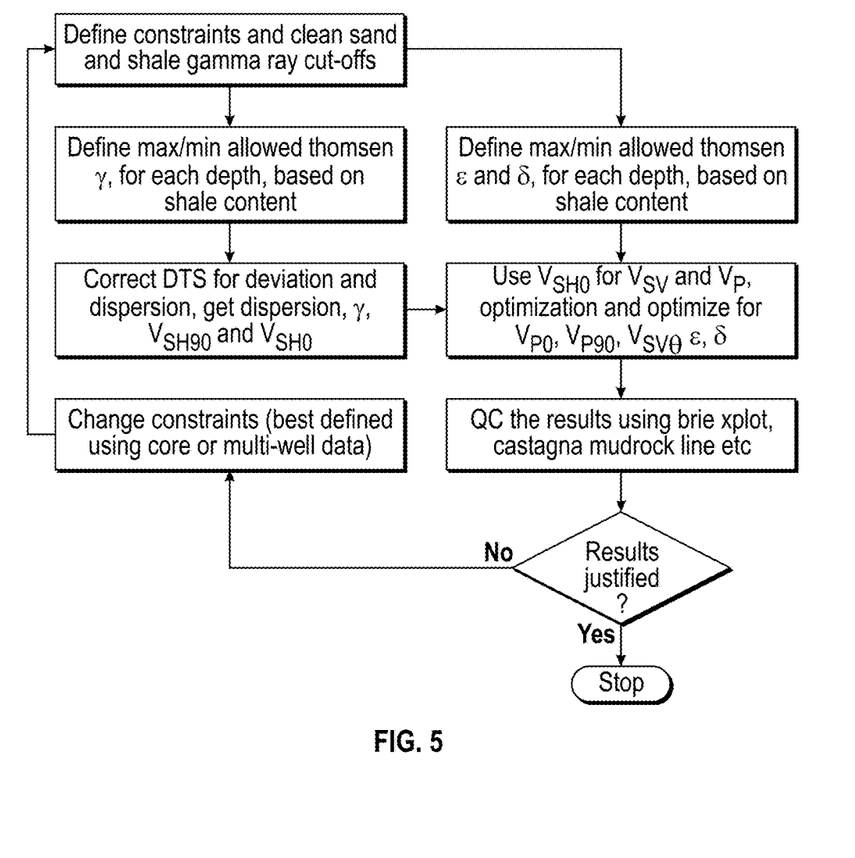
FIG. 5 is a flow diagram illustrating one embodiment of a method for implementing the present disclosure when optimizing for $V_{SH}$ and using $V_{SH}$ to optimize for Vp and $V_{SV}$.

The methods described herein demonstrate that the effects direction dependence of wave velocities in rocks, referred to as anisotropy or deviation, and dispersion on sonic log measurements for deviated wells in laminated formations, during or after drilling (logging while drilling (LWD) or wireline) can be simultaneously corrected. The following description of the correction procedure is also illustrated by the methods in FIGS. 4-5, which are consolidated in FIGS. 11A-11B.

In a laminated medium, which is sometimes referred to as vertically transverse isotropic (VTI), there are a number of wave types that can be measured using acoustic/sonic logs. The most important wave types are $V_{SH}$, $V_{SV}$ (shear wave velocities with horizontal and vertical polarizations, respectively), and $V_P$ (compressional wave velocity). For shear waves, in addition to deviation correction, sometimes there are dispersion effects in LWD measurements that also need to be corrected. Depending on the tools that measure sonic velocities in rock formations, frequently only one type of shear wave is measured. Therefore, the correction procedure disclosed herein will work with only a single shear or both ($V_{SH}$ is usually faster than $V_{SV}$). As a result, $V_{SV}$ can be reconstructed from $V_{SH}$ sonic log measurements along the borehole.

The equations for compressional and shear waves in VTI media, which include Thomsen parameters $\varepsilon$, $\gamma$, and $\delta$, are:

$$V_{SH}(\theta) = \beta\sqrt{1+2\gamma\sin\theta} - d \tag{1}$$

$$\frac{V_{SV}^2(\theta)}{\alpha^2} = \tag{2}$$

$$1+\varepsilon\sin^2\theta - \frac{f}{2} - \frac{f}{2}\sqrt{1+\frac{4\sin^2\theta}{f}(2\delta\cos^2\theta - \varepsilon\cos 2\theta)+\frac{4\varepsilon^2\sin^4\theta}{f^2}}$$

$$\frac{V_P^2(\theta)}{\alpha^2} = \tag{3}$$

$$1+\varepsilon\sin^2\theta - \frac{f}{2} + \frac{f}{2}\sqrt{1+\frac{4\sin^2\theta}{f}(2\delta\cos^2\theta - \varepsilon\cos 2\theta)+\frac{4\varepsilon^2\sin^4\theta}{f^2}}$$

where, $$f = 1 - \frac{\beta^2}{\alpha^2}$$

where $\theta$ is the angle of wave propagation (the angle between the wellbore and lamination), d (in equation (1)) is the dispersion, $\alpha$ is the same as $V_p(0)$ and $\beta$ is the same as $V_s(0)$. The Thomsen parameters $\varepsilon$, $\gamma$, and $\delta$ are defined in terms of stiffness matrix components $C_{ij}$ as shown in equations (4-6).

$$\varepsilon = \frac{C_{11}-C_{33}}{2C_{33}} \tag{4}$$

$$\gamma = \frac{C_{66}-C_{44}}{2C_{44}} \tag{5}$$

$$\delta = \frac{(C_{13}-C_{44})^2 - (C_{33}-C_{44})^2}{2C_{33}(C_{33}-C_{44})} \tag{6}$$

$C_{ij}$ components in VTI media can be expressed using different wave velocities expressed by equations (7-9):

$$\alpha = V_P(0°) = \sqrt{\frac{C_{33}}{\rho}} \tag{7}$$

-continued $$\beta = V_{SH}(0°) = V_{SV}(90°) = V_{SV}(0°) = \sqrt{\frac{C_{44}}{\rho}} \quad (8)$$

$$V_{SH}(90)\sqrt{\frac{C_{66}}{\rho}} \quad (9)$$

A non-linear solver may be used to find an optimal set of values for vertical and horizontal velocities to minimize the difference between the measured Vθ and the modeled Vθ obtained using equations (1 and 3). In other words, the solver perturbs the values of the Thomsen parameters and velocities $V_p$ (0) and $V_s$ (0) until it finds a minimum in the difference between the modelled and measured data. In doing so, a number of constraints are imposed using the Thomsen parameters. Use of the Thomsen parameters is convenient because they are dimensionless numbers smaller than 1, which govern the relationships between velocities in different directions. The constraints are thus, imposed in terms of the Thomsen parameters but keep the velocities as variables. Lamination and anisotropy are more common in shale formations. Shale formations tend to have higher gamma ray readings on well log measurements. Therefore, the constraints for the Thomsen parameters are scaled using gamma ray data. That means intervals with higher gamma ray values will have larger Thomsen parameters (more anisotropic) and vice versa. The constraints for the Thomsen parameters are scaled by defining the "clean" and "shale" gamma ray readings. Equations (10-12) may be used to scale the constraints for the Thomsen parameters. The maximum values for the Thomsen parameters should be chosen based on core measurements or a combination of vertical, horizontal, and 45 degree velocity measurements from the same well or neighboring wells.

$$\varepsilon = \varepsilon_{max} \frac{GR - GR_{clean}}{GR_{shale} - GR_{clean}} \quad (10)$$

$$\gamma = \gamma_{max} \frac{GR - GR_{clean}}{GR_{shale} - GR_{clean}} \quad (11)$$

$$\delta = \delta_{max} \frac{GR - GR_{clean}}{GR_{shale} - GR_{clean}} \quad (12)$$

Figure 2A:
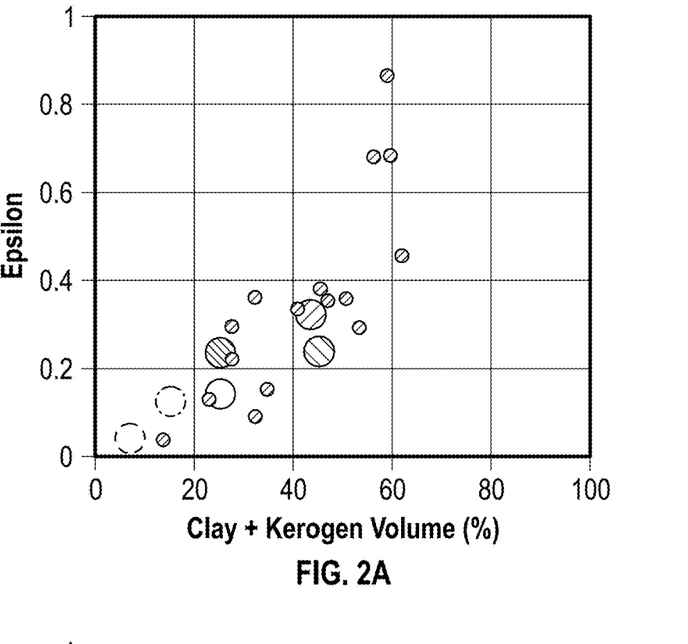
FIG. 2A is a graph illustrating an exemplary plot of a Thomsen parameter (Epsilon) as a function of the sum of clay and kerogen volume (%).
Figure 2B:
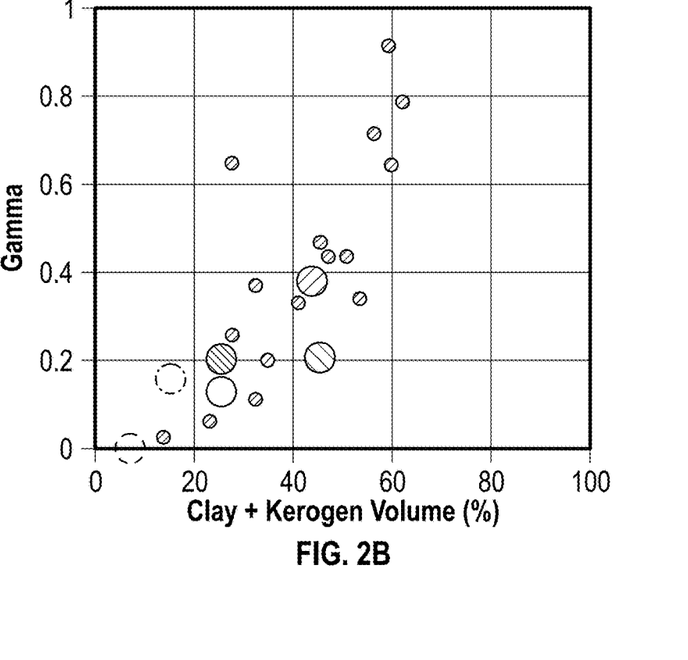
FIG. 2B is a graph illustrating an exemplary plot of a Thomsen parameter (Gamma) as a function of the sum of clay and kerogen volume (%).

Scaling (i.e., defining the constraints) the constraints for the Thomsen parameters, might be defined more accurately using more relevant parameters such as volume of clay, volume of shale and/or kerogen content. In FIG. 2A, a graph illustrates an exemplary plot of a Thomsen parameter (Epsilon) as a function of the sum of clay and kerogen volume (%). In FIG. 2B, a graph illustrates an exemplary plot of a Thomsen parameter (Gamma) as a function of the sum of clay and kerogen volume (%). FIGS. 2A-2B thus, illustrates the relationships between P wave (Epsilon) and S-wave (Gamma) anisotropies with volume of clay and kerogen. These parameters require additional well log measurements or interpretations such as spectral gamma ray log or interpreted kerogen volume. Therefore, equations (10-12) are assumed for situations where gamma ray log information is available. If additional data are available, however, equations (10-12) can be modified as demonstrated by equations (13-14):

$$\varepsilon = \varepsilon_1 V_{clay} \varepsilon_2 V_{kerogen} \quad (13)$$

$$\gamma = \gamma_1 V_{clay} + \gamma_2 V_{kerogen} \quad (14)$$

or equations (10-12) can be modified as a function of the Thomsen parameters in equation (15):

$$\delta = f(\varepsilon, \gamma) \quad (15)$$

More complex, non-linear equations might also be used. Correction is performed for each measurement (i.e. data point) separately. That means there is no averaging of properties or obtaining a representative value for velocities for an entire interval. Correction is performed for $V_P$ and $V_{SH}$ first to obtain the vertical ($V_{SV}$), horizontal (Vsh) and 45 degree (V45) velocities and thus, the Thomsen parameters. Then, using equation (2), $V_{SV}$ (θ) may be computed as if it were measured along the borehole. If $V_{SV}$ (θ) is also acquired using modified tools such as dipole sonic, correction should be done for all 3 types of velocity waves, either simultaneously or separately.

If a cross-plot of, for instance, Vp versus Vs is made, sonic log measurements for certain rock types should fall near predefined lines that represent reported trends. Well known rock physics cross-plots (e.g. Castagna Mudrock and Brie) may thus, be used to validate the results of velocity correction. It should be noted that these cross-plots may be reconstructed according to the location of the well, to achieve a more accurate representation of the rock physics for the area. After velocity correction, the sonic log measurements in the cross-plots should be shifted near the predefined lines that represent reported trends. If, after correction, the sonic log measurements are still not consistent with such trends, the extents ($\varepsilon_{max}$, $\gamma_{max}$, $\delta_{max}$, $GR_{clean}$, $GR_{shale}$) may be changed before repeating the correction procedure.

Figure 3A:
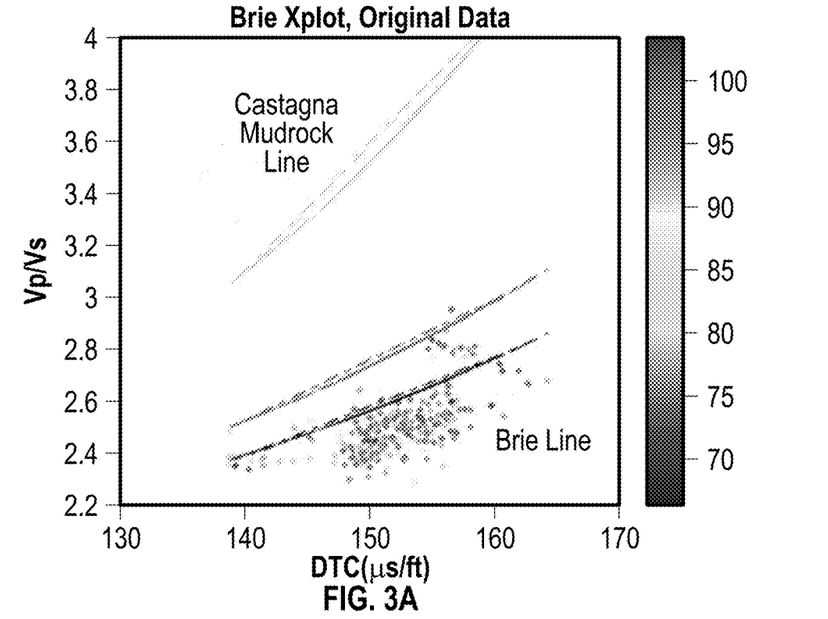
FIG. 3A is a graph illustrating an exemplary plot of original sonic log measurements of: compressional sonic velocity (Vp) divided by shear sonic velocity (Vs) as a function of compressional slowness (DTC).
Figure 3B:
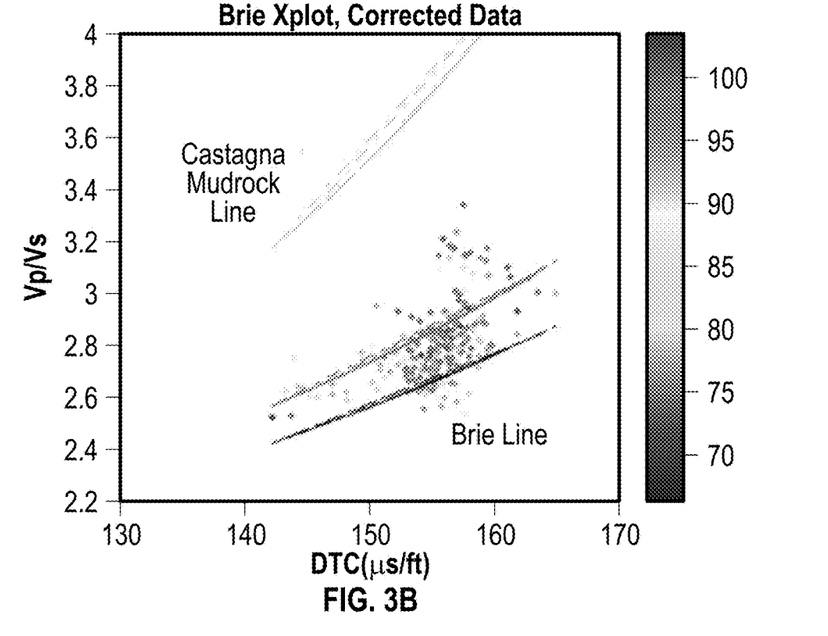
FIG. 3B is a graph illustrating an exemplary plot of corrected sonic log measurements from FIG. 3A.

In FIG. 3A, a graph illustrates an exemplary plot of original sonic log measurements of compressional sonic velocity (Vp) divided by shear sonic velocity (Vs) as a function of compressional slowness (DTC). The original sonic log measurements from certain shales should fall near a predefined shale line that represents reported trends for shale. In FIG. 3A, the original sonic log measurements should fall near the middle shale line but do not. Instead, they fall near a Brie line and further away from the Castagna line, which represent reported rock physics trends. In FIG. 3B, a graph illustrates an exemplary plot of corrected sonic log measurements from FIG. 3A. In FIG. 3B, the sonic log measurements after correction fall near the middle shale line. FIGS. 3A-3B thus, demonstrate how rock physics cross-plots may be used for validation of velocity deviation correction. It should be noted that there are no constraints imposed, which are based on the Brie or Castagna trend lines during the correction as it will bias the correction results.

Figure 11A:
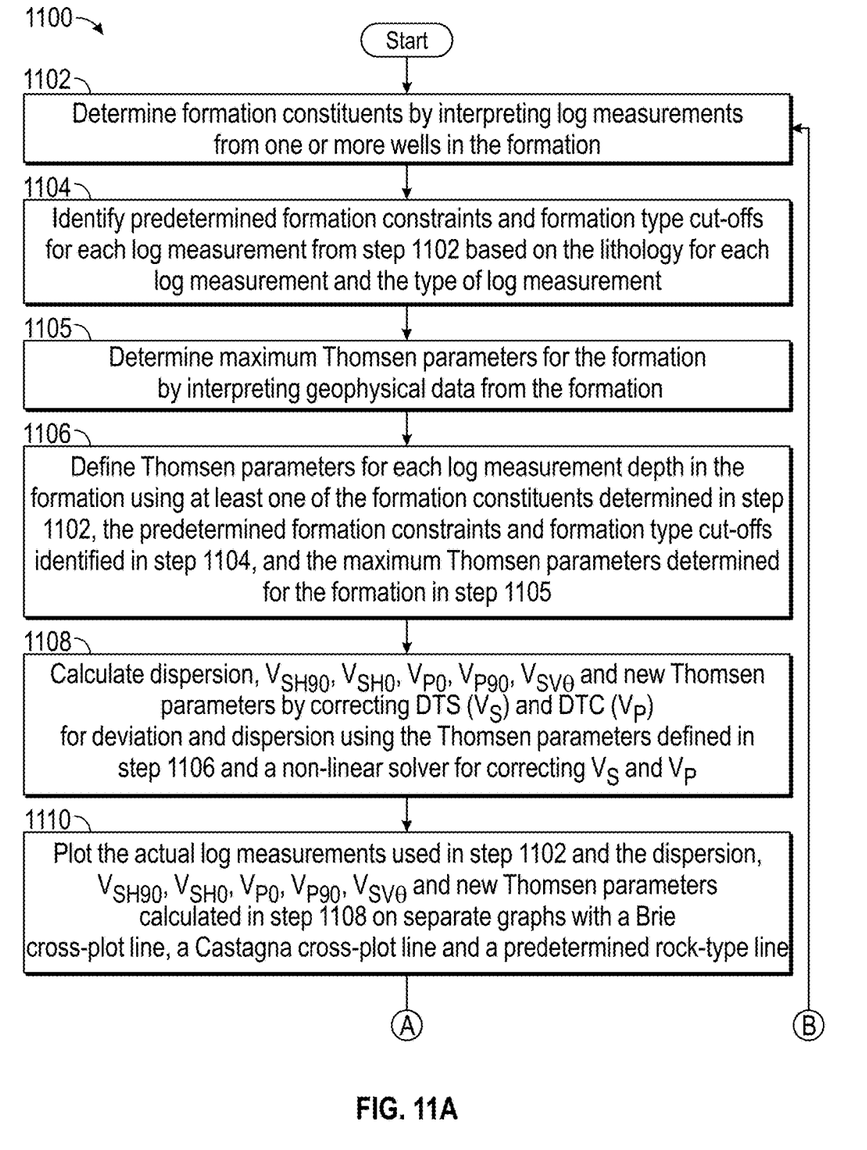
FIGS. 11A-11B are a flow diagram illustrating another embodiment of a method for implementing the present disclosure when optimizing for Vp and Vs simultaneously or when optimizing for $V_{SH}$ and using $V_{SH}$ to optimize for Vp and $V_{SV}$.
Figure 11B:
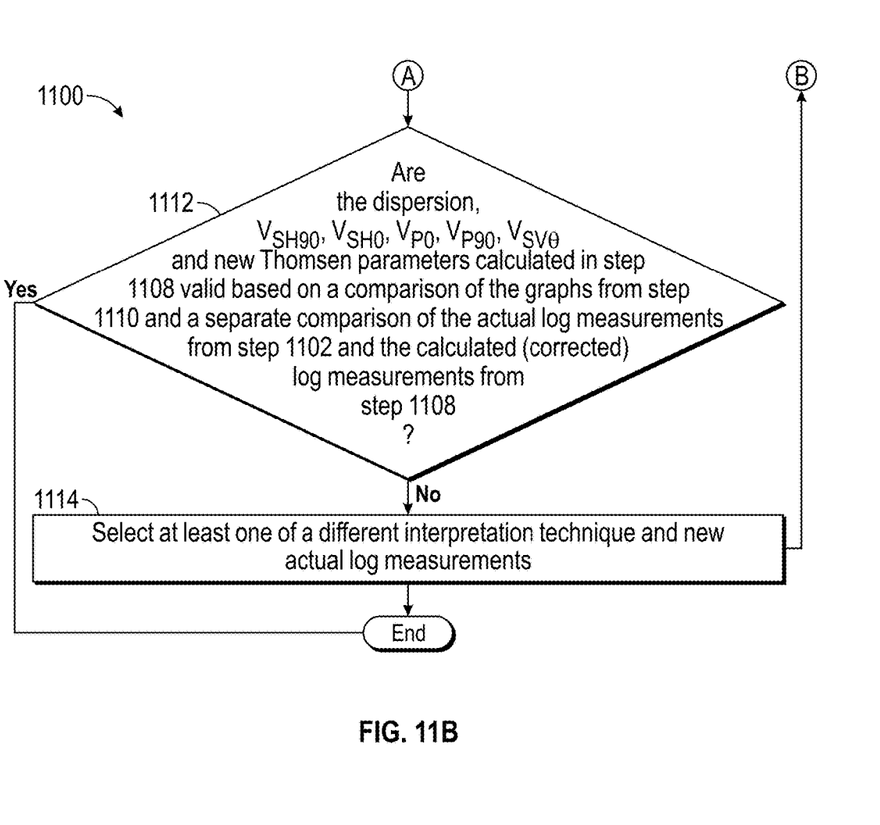

Referring now to FIGS. 11A-11B, a flow diagram illustrates another embodiment of a method 1100 for implementing the present disclosure when optimizing for Vp and Vs simultaneously or when optimizing for $V_{SH}$ and using $V_{SH}$ to optimize for Vp and $V_{SV}$.

In step 1102, formation constituents (e.g. mineralogy, organic carbon, kerogen) are determined by interpreting log measurements from one or more wells in the formation using techniques well known in the art for formation evaluation.

In step 1104, predetermined formation constraints (e.g. log measurement ranges) and formation type cut-offs (e.g. min/max gamma ray log readings) are identified for each log measurement from step 1102 based on the lithology for each log measurement and the type of log measurement.

In step 1105, maximum Thomsen parameters are determined for the formation by interpreting geophysical data (e.g. core data, vertical seismic profiling data, surface seismic data) from the formation using equations (10-12) or (13-15) and techniques well known in the art for formation evaluation.

In step 1106, Thomsen parameters for each log measurement depth in the formation are defined using at least one of the formation constituents determined in step 1102, the predetermined formation constraints and formation type cut-offs identified in step 1104, the maximum Thomsen parameters determined for the formation in step 1105 and equations (10-12) or (13-15). In equations (10-12) for example, the formation constituent is shale and the predetermined formation constraints and formation type cut-offs are gamma ray or volume of clay measurements.

In step 1108, dispersion, $V_{SH90}$, $V_{SH0}$, $V_{P0}$, $V_{P90}$, $V_{SV\theta}$ and new Thomsen parameters are calculated by correcting DTS ($V_S$) and DTC ($V_P$) for deviation and dispersion using the Thomsen parameters defined in step 1106 and a non-linear solver in the manner described herein for correcting $V_S$ and $V_P$.

In step 1110, the actual log measurements used in step 1102 and the dispersion, $V_{SH90}$, $V_{SH0}$, $V_{P0}$, $V_{P90}$, $V_{SV\theta}$ and new Thomsen parameters calculated in step 1108 may be plotted on separate graphs with a Brie cross-plot line, a Castagna cross-plot line and a predetermined rock-type line in the manner described in reference to FIGS. 3A-3B.

In step 1112, the method 1100 determines whether the dispersion, $V_{SH90}$, $V_{SH0}$, $V_{P0}$, $V_{P90}$, $V_{SV\theta}$ and new Thomsen parameters calculated in step 1108 are valid based on a comparison of the graphs from step 1110 and a separate comparison of the actual log measurements from step 1102 and the calculated (corrected) log measurements from step 1108. Validity may be concluded—either comparison demonstrates the compared results are within a predetermined margin of error. If the dispersion, $V_{SH90}$, $V_{SH0}$, $V_{P0}$, $V_{P90}$, $V_{SV\theta}$ and new Thomsen parameters calculated in step 1108 are valid, then the method 1100 ends. Otherwise, the method 1100 proceeds to step 1114.

In step 1114, at least one of a different interpretation technique and new actual log measurements are selected and the method 1100 returns to step 1102.

Example

Figure 6:
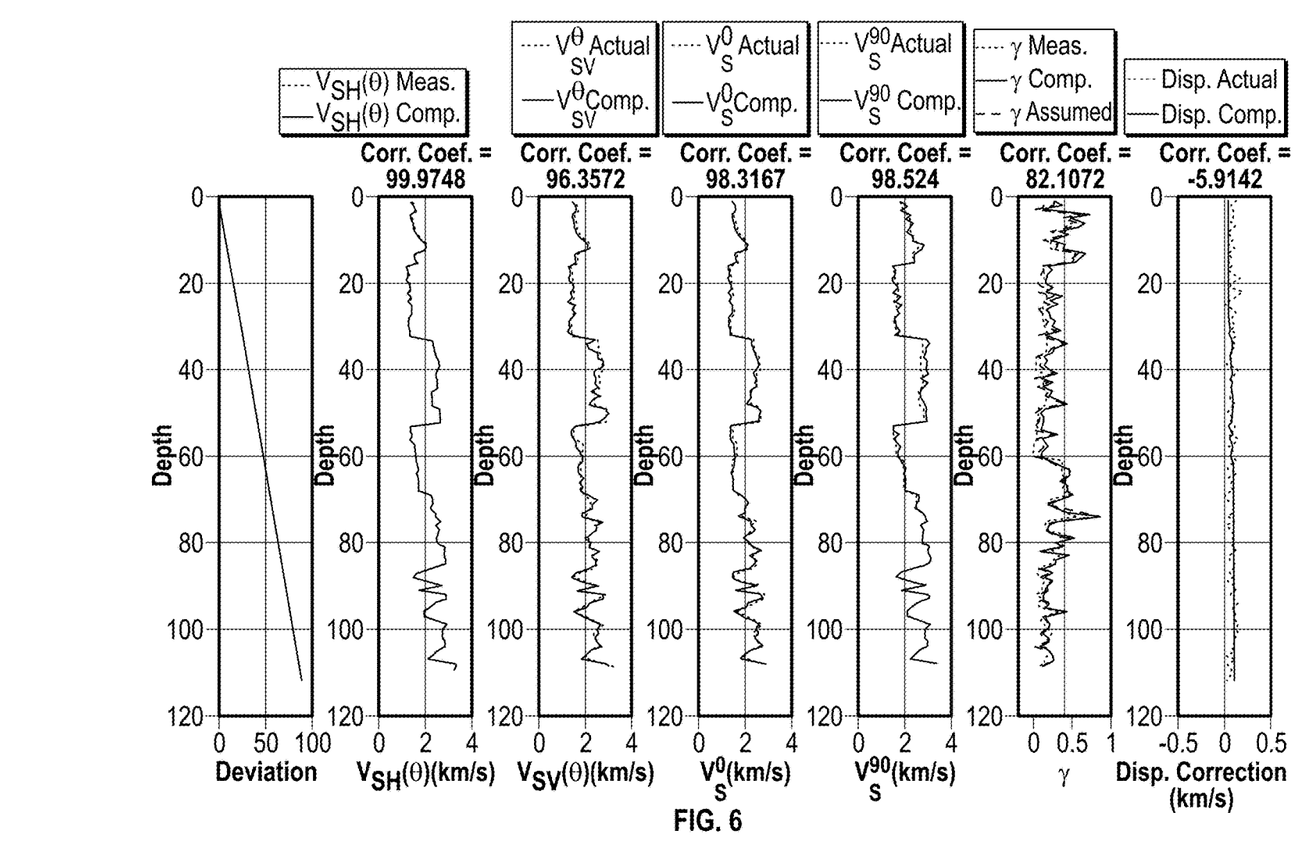
FIG. 6 illustrates simulated sonic logs for deviation and for comparing actual or measured values of velocity properties/parameters with values for the same velocity properties/parameters in a deviated well that were corrected according to the method illustrated in FIG. 11.
Figure 7:
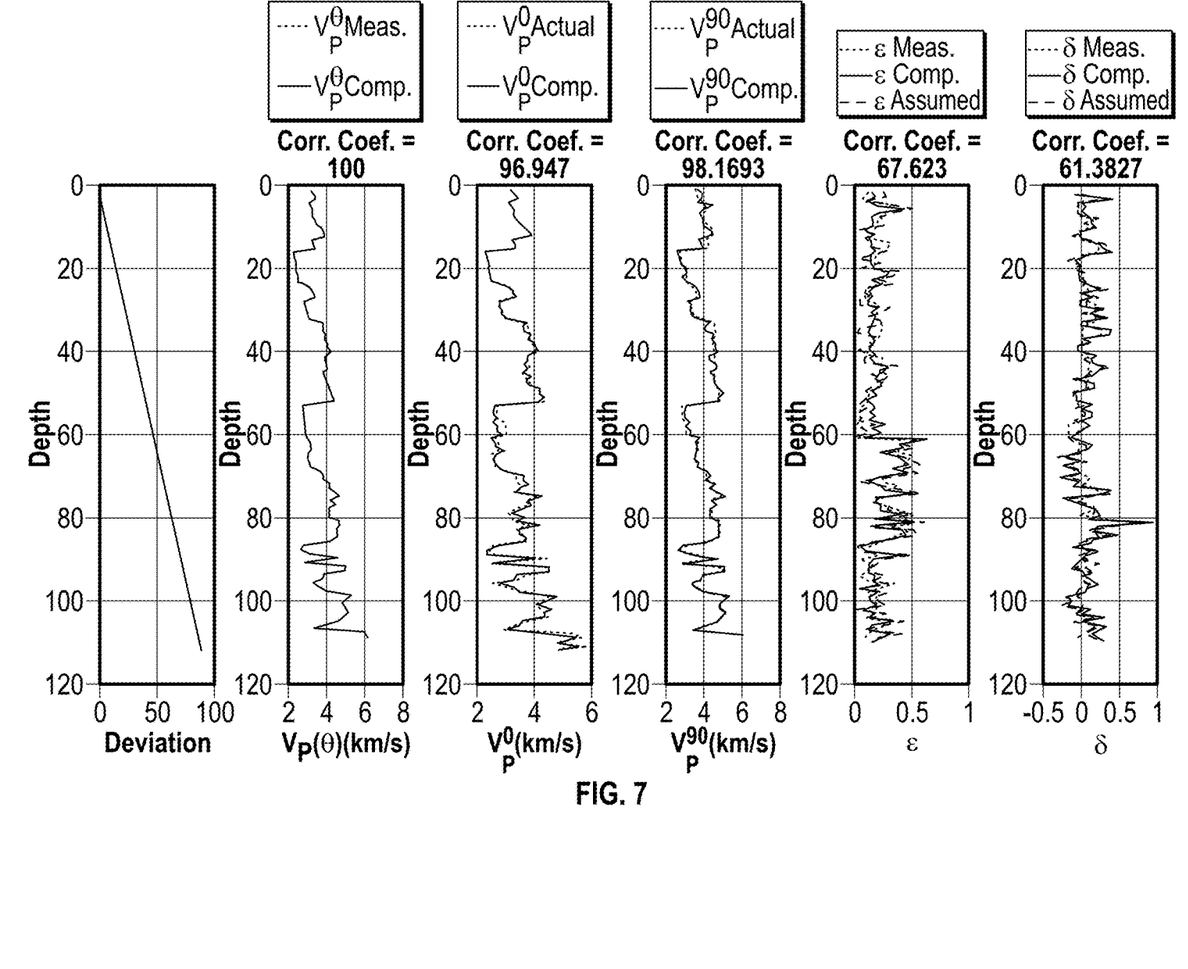
FIG. 7 illustrates simulated sonic logs for deviation and for comparing actual or measured values of velocity properties/parameters with values for the same velocity properties/parameters in a deviated well that were corrected according to the method illustrated in FIG. 11.
Figure 8:
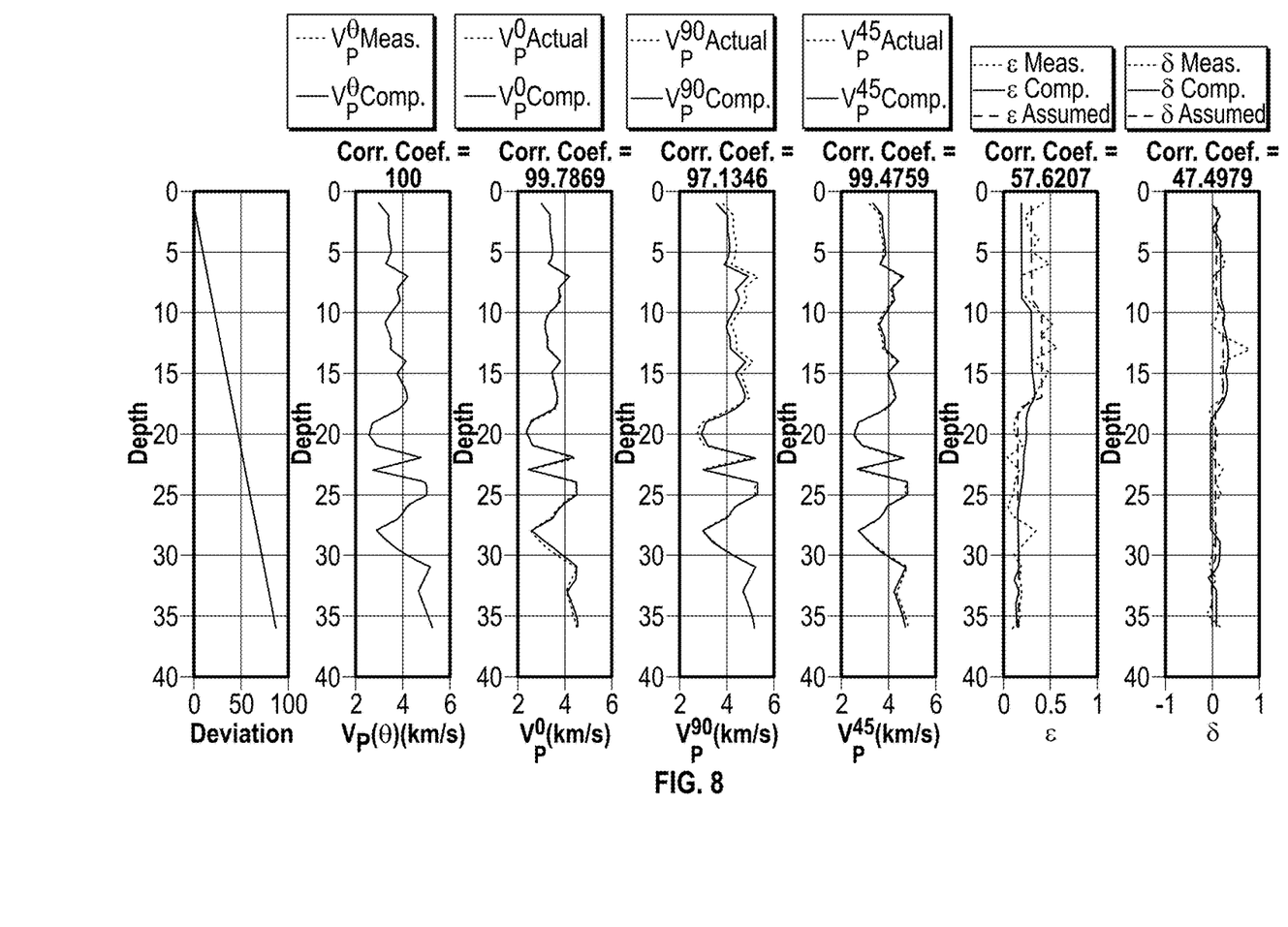
FIG. 8 illustrates simulated sonic logs for deviation and for comparing actual or measured values of velocity properties/parameters with values for the same velocity properties/parameters in a deviated well that were corrected according to the method illustrated in FIG. 11.
Figure 9:
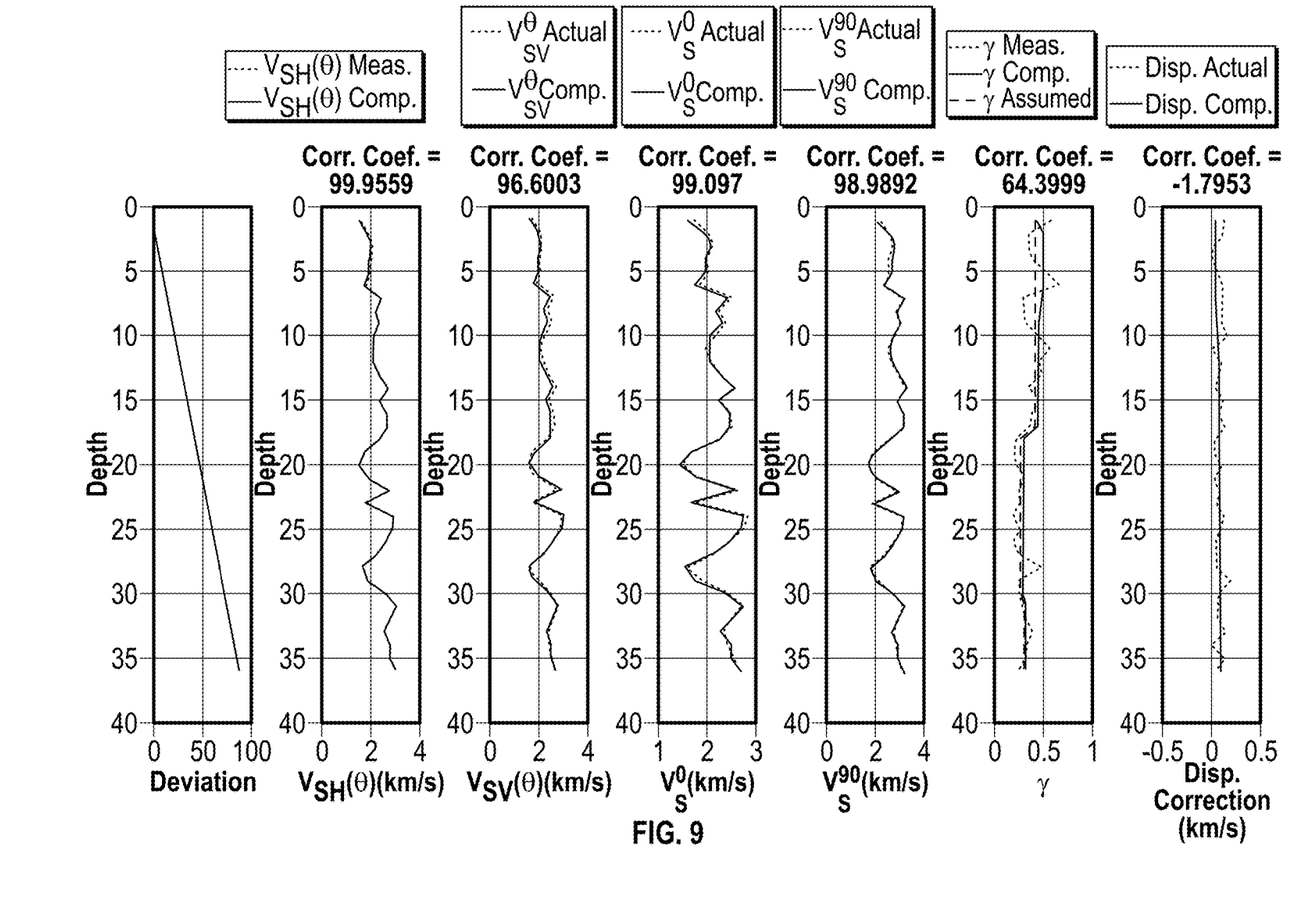
FIG. 9 illustrates simulated sonic logs for deviation and for comparing actual or measured values of velocity properties/parameters with values for the same velocity properties/parameters in a deviated well that were corrected according to the method illustrated in FIG. 11.

In the example, published ultrasonic data were used with equations (1-3) to model (simulate) velocity at the deviation angles illustrated in the first simulated sonic log of FIGS. 6-9. The modelled velocities (Vp(theta), $V_{SV}$(theta), Vsh(theta)) were used to determine the accuracy of the corrected vertical and horizontal velocities. In doing so, an estimate of the Thomsen parameters was assumed. In FIGS. 6-7, random noise was added to the actual values of the Thomsen parameters and the noisy values were used as the actual sonic log data. In FIGS. 8-9, the same type of testing for data from four different shale formations was used. The Thomsen parameters for each shale formation were averaged and the averaged values were used as the actual sonic log data. The noisy values for the Thomsen parameter $\gamma$ are assumed values illustrated by the dashed curves and the dotted curves illustrate the measured values. The solid curves illustrate the computed (corrected) values. For velocities, the dotted curves illustrate the measured and actual values and the solid curves illustrate the computed (corrected) values.

System Description

The present disclosure may be implemented through a computer-executable program of instructions, such as program modules, generally referred to as software applications or application programs executed by a computer. The software may include, for example, routines, programs, objects, components and data structures that perform particular tasks or implement particular abstract data types. The software forms an interface to allow a computer to react according to a source of input. DecisionSpace® software, which is a commercial software application marketed by Landmark Graphics Corporation, may be used as an interface application to implement the present disclosure. The software may also cooperate with other code segments to initiate a variety of tasks in response to data received in conjunction with the source of the received data. The software may be stored and/or carried on any variety of memory such as CD-ROM, magnetic disk, bubble memory and semiconductor memory (e.g. various types of RAM or ROM). Furthermore, the software and its results may be transmitted over a variety of carrier media such as optical fiber, metallic wire and/or through any of a variety of networks, such as the Internet.

Moreover, those skilled in the art will appreciate that the disclosure may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present disclosure. The disclosure may be practiced in distributed-computing environments where tasks are performed by remote-processing devices that are linked through a communications network. In a distributed-computing environment, program modules may be located in both local and remote computer-storage media including memory storage devices. The present disclosure may therefore, be implemented in connection with various hardware, software or a combination thereof, in a computer system or other processing system.

Figure 10:
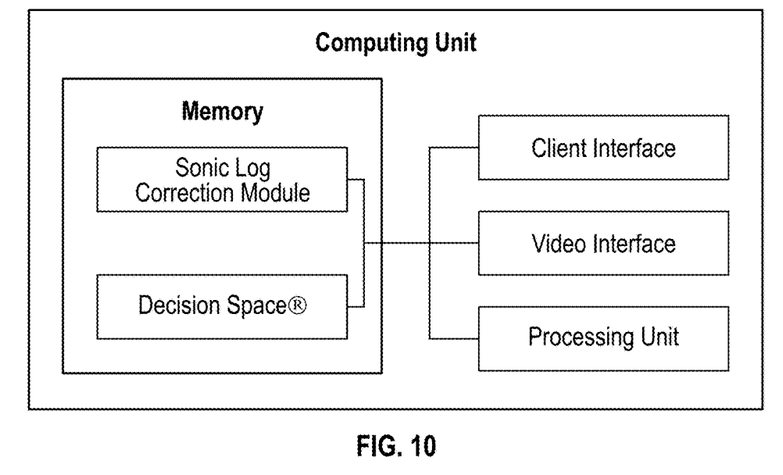
FIG. 10 is a block diagram illustrating one embodiment of a computer system for implementing the present disclosure.

Referring now to FIG. 10, a block diagram illustrates one embodiment of a system for implementing the present disclosure on a computer. The system includes a computing unit, sometimes referred to as a computing system, which contains memory, application programs, a client interface, a video interface, and a processing unit. The computing unit is only one example of a suitable computing environment and is not intended to suggest any limitation as to the scope of use or functionality of the disclosure.

The memory primarily stores the application programs, which may also be described as program modules containing computer-executable instructions, executed by the computing unit for implementing the present disclosure described herein and illustrated in FIGS. 1-9, 11A-11B. The memory therefore, includes a sonic log correction module, which enables steps 1105-1114 described in reference to FIGS. 11A-11B. The sonic log correction module may integrate functionality from the remaining application programs illustrated in FIG. 10. In particular, DecisionSpace® software may be used as an interface application to perform steps 1102-1104 in FIGS. 11A-11B. Although DecisionSpace® software may be used as interface application, other interface applications may be used, instead, or the sonic log correction module may be used as a stand-alone application.

Although the computing unit is shown as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to, and/or presently being operated on, the processing unit. By way of example, and not limitation, the computing unit includes an operating system, application programs, other program modules, and program data.

The components shown in the memory may also be included in other removable/nonremovable, volatile/nonvolatile computer storage media or they may be implemented in the computing unit through an application program interface ("API") or cloud computing, which may reside on a separate computing unit connected through a computer system or network. For example only, a hard disk drive may read from or write to nonremovable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through the client interface that is coupled to a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well-known.

While the present disclosure has been described in connection with presently preferred embodiments, it will be understood by those skilled in the art that it is not intended to limit the disclosure to those embodiments. It is therefore, contemplated that various alternative embodiments and modifications may be made to the disclosed embodiments without departing from the spirit and scope of the disclosure defined by the appended claims and equivalents thereof.

The invention claimed is:

1. A method comprising:
    a) defining, by a processor, Thomsen parameters for each log measurement depth using at least one of one or more formation constituents, one or more predetermined formation constraints, one or more predetermined formation type cut-offs and maximum Thomsen parameters for the formation;
    b) correcting, by the processor, shear wave travel time (DTS) and compressional wave travel time (DTC) simultaneously for deviation and dispersion on sonic log measurements of deviated wells using the Thomsen parameters and a non-linear solver;
    c) calculating, by the processor, dispersion, shear wave velocity with horizontal polarizations at 90 degrees ($V_{SH90}$), shear wave velocity with horizontal polarizations at 0 degrees ($V_{SH0}$), compressional wave velocity at 0 degrees ($V_{P0}$), compressional wave velocity at 90 degrees ($V_{P90}$), shear wave velocity at θ degrees ($V_{SV\theta}$), and new Thomsen parameters based on the corrected sonic log measurements; and
    d) plotting, by the processor, the actual log measurements and the calculated dispersion, $V_{SH90}$, $V_{SH0}$, $V_{P0}$, $V_{P90}$, $V_{SV\theta}$, new Thomsen parameters on separate respective graphs;
    e) building, by the processor, a model of the deviated well using the calculated dispersion, $V_{SH90}$, $V_{SH0}$, $V_{P0}$, $V_{P90}$, $V_{SV\theta}$, and new Thomsen parameters.

2. The method of claim 1, further comprising plotting one or more predetermined velocity trend lines and a predetermined rock-type line on each graph.

3. The method of claim 1, wherein the one or more formation constituents are determined by interpreting the actual log measurements from one or more wells in the formation.

4. The method of claim 3, wherein the one or more predetermined formation constraints and the one or more predetermined formation type cut-offs are identified for each actual log measurement based on a lithology for each log measurement and a type of log measurement.

5. The method of claim 4, wherein the maximum Thomsen parameters are determined for the formation by interpreting geophysical data from the formation.

6. The method of claim 5, further comprising:
    d) selecting at least one of a different interpretation technique and one or more new actual log measurements; and
    e) repeating steps a)-d) using the at least one of the different interpretation technique and the one or more new actual log measurements until the calculated dispersion, $V_{SH90}$, $V_{SH0}$, $V_{P0}$, $V_{P90}$, $V_{SV\theta}$, and new Thomsen parameters are validated.

7. The method of claim 6, wherein validation of the calculated dispersion, $V_{SH90}$, $V_{SH0}$, $V_{P0}$, $V_{P90}$, $V_{SV\theta}$, and new Thomsen parameters is based on a comparison of each graph.

8. The method of claim 7, wherein validation of the calculated dispersion, $V_{SH90}$, $V_{SH0}$, $V_{P0}$, $V_{P90}$, $V_{SV\theta}$, and new Thomsen parameters is based on a comparison of the actual log measurements and the calculated dispersion, $V_{SH90}$, $V_{SH0}$, $V_{P0}$, $V_{P90}$, $V_{SV\theta}$, and new Thomsen parameters.

9. The method of claim 2, wherein the one or more predetermined velocity trend lines include a Brie cross-plot line and a Castagna cross-plot line.

10. A non-transitory program carrier device tangibly carrying computer executable instructions for correcting the effects of deviation and dispersion on sonic log measurements of deviated wells, the instructions being executable to implement:
    a) defining Thomsen parameters for each log measurement depth using at least one of one or more formation constituents, one or more predetermined formation constraints, one or more predetermined formation type cut-offs and maximum Thomsen parameters for the formation;

b) correcting shear wave travel time (DTS) and compressional wave travel time (DTC) simultaneously for deviation and dispersion on sonic log measurements of deviated wells using the Thomsen parameters and a non-linear solver;

c) calculating dispersion, shear wave velocity with horizontal polarizations at 90 degrees ($V_{SH90}$), shear wave velocity with horizontal polarizations at 0 degrees ($V_{SH0}$), compressional wave velocity at 0 degrees ($V_{P0}$), compressional wave velocity at 90 degrees ($V_{P90}$), shear wave velocity at θ degrees ($V_{SVθ}$), and new Thomsen parameters based on the corrected sonic log measurements;

d) plotting the actual log measurements and the calculated dispersion, $V_{SH90}$, $V_{SH0}$, $V_{P0}$, $V_{P90}$, $V_{SVθ}$, new Thomsen parameters on separate respective graphs; and e) building a model of the deviated well using the calculated dispersion, $V_{SH90}$ $V_{SH0}$, $V_{P0}$, $V_{P90}$, $V_{SVθ}$, and new Thomsen parameters.

11. The program carrier device of claim 10, further comprising plotting one or more predetermined velocity trend lines and a predetermined rock-type line on each graph.

12. The program carrier device of claim 10, wherein the one or more formation constituents are determined by interpreting the actual log measurements from one or more wells in the formation.

13. The program carrier device of claim 12, wherein the one or more predetermined formation constraints and the one or more predetermined formation type cut-offs are identified for each actual log measurement based on a lithology for each log measurement and a type of log measurement.

14. The program carrier device of claim 13, wherein the maximum Thomsen parameters are determined for the formation by interpreting geophysical data from the formation.

15. The program carrier device of claim 14, further comprising:
d) selecting at least one of a different interpretation technique and one or more new actual log measurements; and
e) repeating steps a) d) using the at least one of the different interpretation technique and the one or more new actual log measurements until the calculated dispersion, $V_{SH90}$, $V_{SH0}$, $V_{P0}$, $V_{P90}$, $V_{SVθ}$, and new Thomsen parameters are validated.

16. The program carrier device of claim 15, wherein validation of the calculated dispersion, $V_{SH90}$, $V_{SH0}$, $V_{P0}$, $V_{P90}$, $V_{SVθ}$, and new Thomsen parameters is based on a comparison of each graph.

17. The program carrier device of claim 16, wherein validation of the calculated dispersion, $V_{SH90}$, $V_{SH0}$, $V_{P0}$, $V_{P90}$, $V_{SVθ}$, and new Thomsen parameters is based on a comparison of the actual log measurements and the calculated dispersion, $V_{SH90}$, $V_{SH0}$, $V_{P0}$, $V_{P90}$, $V_{SVθ}$, and new Thomsen parameters.

18. The program carrier device of claim 11, wherein the one or more predetermined velocity trend lines include a Brie cross-plot line and a Castagna cross-plot line.

19. A non-transitory program carrier device tangibly carrying computer executable instructions for correcting the effects of deviation and dispersion on sonic log measurements of deviated wells, the instructions being executable to implement:

a) defining Thomsen parameters for each log measurement depth using at least one of one or more formation constituents, one or more predetermined formation constraints, one or more predetermined formation type cut-offs and maximum Thomsen parameters for the formation wherein the one or more predetermined formation constraints and the one or more predetermined formation type cut-offs are identified for each actual log measurement;

b) correcting shear wave travel time (DTS) and compressional wave travel time (DTC) simultaneously for deviation and dispersion on sonic log measurements of deviated wells using the Thomsen parameters and a non-linear solver;

c) calculating dispersion, shear wave velocity with horizontal polarizations at 90 degrees ($V_{SH90}$), shear wave velocity with horizontal polarizations at 0 degrees ($V_{SH0}$), compressional wave velocity at 0 degrees ($V_{P0}$), compressional wave velocity at 90 degrees ($V_{P90}$), shear wave velocity at θ degrees ($V_{SVθ}$), and new Thomsen parameters based on the corrected sonic log measurements; and d) plotting the actual log measurements and the calculated dispersion, $V_{SH90}$, $V_{SH0}$, $V_{P0}$, $V_{P90}$, $V_{SVθ}$, new Thomsen parameters on separate respective graphs; and e) building a model of the deviated well using the calculated dispersion, $V_{SH90}$ $V_{SH0}$, $V_{P0}$, $V_{P90}$, $V_{SVθ}$, and new Thomsen parameters.

20. The program carrier device of claim 19, further comprising:
d) selecting at least one of a different interpretation technique and one or more new actual log measurements; and
e) repeating steps a)-d) using the at least one of the different interpretation technique and the one or more new actual log measurements until the calculated dispersion, $V_{SH90}$, $V_{SH0}$, $V_{P0}$, $V_{P90}$, $V_{SVθ}$, and new Thomsen parameters are validated.

* * * * *